(12) United States Patent
     Poulose

(10) Patent No.: US 12,698,838 B2
(45) Date of Patent: Aug. 4, 2026

(54) ELECTRO-MAGNETIC THERMAL CONTROL VALVE

(71) Applicant: Ingersoll-Rand Industrial U.S., Inc., Davidson, NC (US)

(72) Inventor: Vineeth Poulose, Bengaluru (IN)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 274 days.

(21) Appl. No.: 18/130,143

(22) Filed: Apr. 3, 2023

(65) Prior Publication Data

US 2024/0328521 A1     Oct. 3, 2024

(51) Int. Cl.
| | |
|---|---|
| *F16K 11/00* | (2006.01) |
| *F16K 11/07* | (2006.01) |
| *F16K 15/18* | (2006.01) |
| *F16K 31/06* | (2006.01) |
| *F28F 27/02* | (2006.01) |

(52) U.S. Cl.
CPC ........ *F16K 11/0716* (2013.01); *F16K 15/184* (2021.08); *F16K 31/0613* (2013.01); *F28F 27/02* (2013.01)

(58) Field of Classification Search
CPC ............... F16K 11/0716; F16K 15/184; F16K 31/0613; F28F 27/02
See application file for complete search history.

(56) References Cited

U.S. PATENT DOCUMENTS

| | | | | |
|---|---|---|---|---|
| 2,896,919 A | * | 7/1959 | Teague, Jr. ............... | F01P 11/08 |
| | | | | 236/34.5 |
| 5,318,151 A | | 6/1994 | Hood et al. | |

| | | | |
|---|---|---|---|
| 9,989,164 B1 | | 6/2018 | Jensen et al. |
| 10,724,524 B2 | | 7/2020 | Peters et al. |

FOREIGN PATENT DOCUMENTS

| | | |
|---|---|---|
| CN | 105840872 A | 8/2016 |
| CN | 114484005 A | 5/2022 |
| DE | 102019110457 A1 | 6/2020 |
| JP | 2020091003 A | 6/2020 |

OTHER PUBLICATIONS

CN 114484005 (English translation) (Year: 2022).*
"Electromagnets." Northeastern, ece.northeastern.edu/fac-ece/nian/mom/electromagnets.html#:~:text=Electromagnets%20are%20a%20different%20from,coils%20behave%20like%20a%20magnet. Accessed Aug. 19, 2025. (Year: 2019).*
Extended European Search Report from European Application No. 24167070.0, dated Aug. 22, 2024.

* cited by examiner

*Primary Examiner* — Jonathan Bradford
(74) *Attorney, Agent, or Firm* — Kevin E. West; Advent, LLP

(57) ABSTRACT

An electro-magnetic thermal control valve (EMTCV) is configured to selectably direct and control an amount of coolant fluid to a cooler in a coolant circulation system. The EMTCV includes a valve housing defining a main chamber, an electromagnet disposed in the valve housing, and a movable sleeve disposed within the main chamber. The movable sleeve is fixedly attached to a permanent magnet adjacent to the electromagnet. When the electromagnet is energized by a current supplied by a valve control system, the electromagnet exerts a force on the permanent magnet, moving the movable sleeve is from an idle position to plurality of intermediate positions or an actuated position.

20 Claims, 7 Drawing Sheets

ELECTRO-MAGNETIC THERMAL CONTROL VALVE

BACKGROUND

Compressors increase the pressure of a compressible fluid (e.g., air, gas, etc.) by reducing the volume of the fluid. Often, compressors are staged so that the fluid is compressed several times in different stages, to further increase the discharge pressure of the fluid. As the pressure of the fluid increases, the temperature of the fluid also increases. In some compressors, the compressed fluid may be cooled in between stages with a cooling system. Compressors may be divided between contact-cooled compressors and oil-free compressors.

DRAWINGS

The Detailed Description is described with reference to the accompanying figures. The use of the same reference numbers in different instances in the description and the figures may indicate similar or identical items.

DETAILED DESCRIPTION

Figure 1:
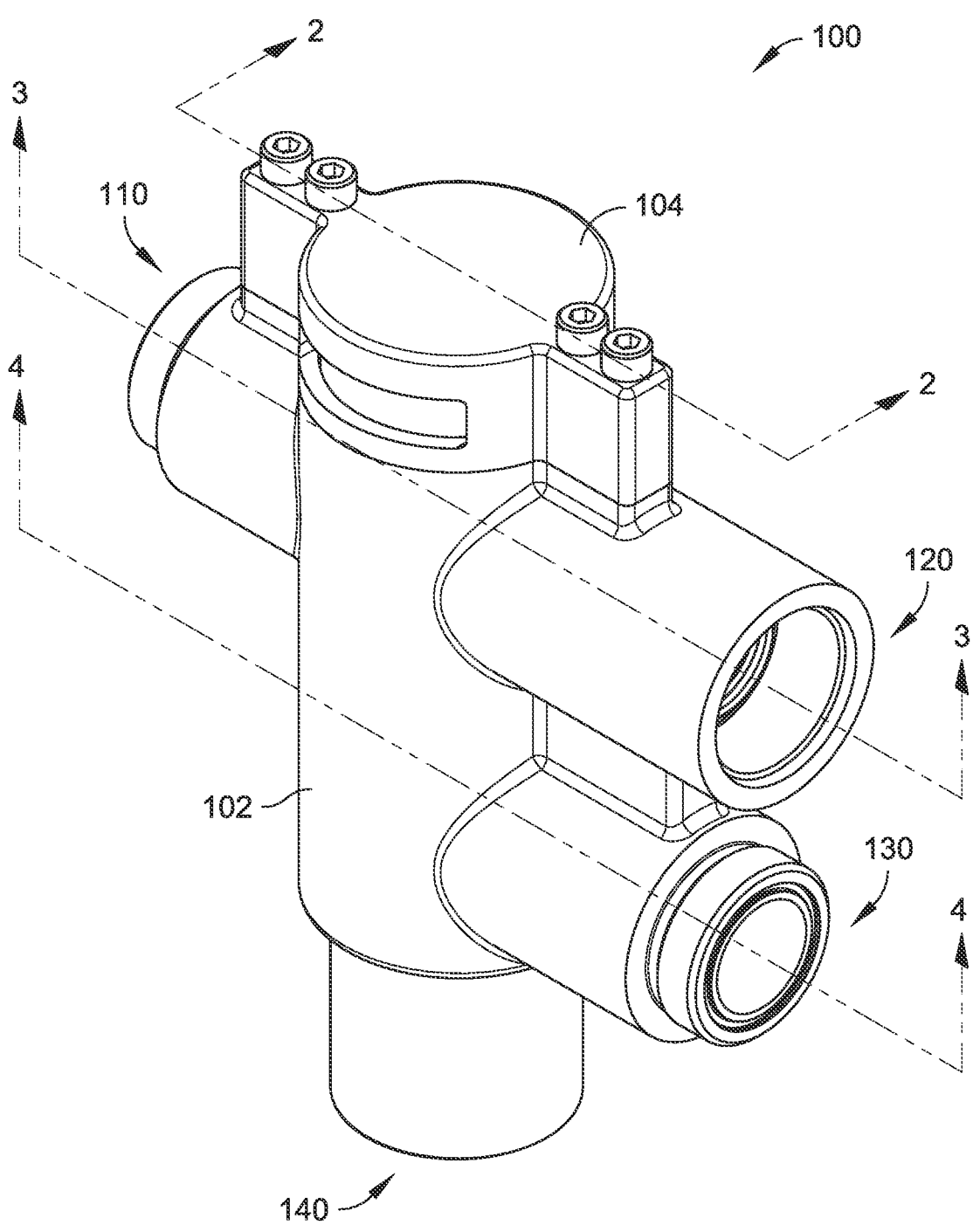
FIG. 1 is an isometric view of an electro-magnetic thermal control valve (EMTCV) in accordance with example embodiments of the present disclosure.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

Overview

Contact-cooled fluid compressors include a coolant circulation system that circulates a coolant fluid (e.g., oil, water, etc.) that is injected into compression cavities within a compressor airend to aid cooling of the working fluid to be compressed. The coolant fluid may also provide lubrication and sealing of the compressor airend. A discharge stream of pressurized working fluid and coolant mixture may be discharged from the contact-cooled airend at a high temperature and separated in a separator tank. After separation in the separator tank, the coolant fluid may be directed to a temperature control valve (TCV). Depending on a desired airend discharge temperature, the TCV may direct the coolant fluid back to circulation in the contact-cooled airend or may direct the coolant fluid to a cooler for cooling prior to recirculation. TCVs regulate the airend discharge temperature by regulating the amount of coolant fluid that flows into the cooler.

Typical TCVs may use wax elements and/or electronic elements (e.g., stepper motors) to drive the operation of the TCVs. These elements are often unreliable and require constant maintenance and replacement of dynamic seals, which are prone to leakage and other types of failure. Moreover, these TCVs are often large in dimension, as they need to accommodate the different mechanical and other electronic elements.

Accordingly, the present disclosure is directed to an electro-magnetic thermal control valve (EMTCV) that regulates an amount of coolant fluid necessary to maintain a desired airend discharge temperature in a fluid compressor system. The EMTCV utilizes an electromagnet to actuate a movable sleeve, reducing the number of moving parts necessary to move the movable sleeve between an idle position to an actuated position.

DETAILED DESCRIPTION OF EXAMPLE EMBODIMENTS

Referring generally to FIGS. 1 through 4, an electro-magnetic thermal control valve (EMTCV) 100 is shown. The EMTCV 100 includes a valve housing 102 defining a coolant fluid inlet 110, a cooler inlet 120, a cooler outlet 130, a coolant fluid outlet 140, and a main chamber 150. The valve housing 102 may include a valve endcap 104 disposed at one end of the valve housing 102, covering an opening (not shown) to the main chamber 150. The main chamber 150 further defines a first sub-chamber 115 and a second sub-chamber 135 along a longitudinal axis 100Y of the main chamber 150.

The EMTCV 100 may be used in a coolant circulation system 1100 of a fluid compressor system 1000 having at least a first airend 1200 and a cooler 1300. The first airend compresses the working fluid (e.g., air, gas, etc.) of the fluid compressor system 1000 in a first compression stage. This compression stage increases the temperature of the working fluid. The cooler 1300 cools a coolant fluid flowing through the first airend 1200, lowering the temperature of the working fluid prior to flowing to a next stage of the compression process. The EMTCV 100 acts as a temperature management system of the coolant circulation system 1100, controlling the amount of a coolant needed to send to the cooler 1300 in order to maintain a desired airend discharge temperature of the first airend 1200 and/or the desired discharge temperature of the fluid compressor system 1000. In embodiments, the next stage of the compression process may be at least a second compression stage (not shown). However, the coolant circulation system 1100 may include more than two compression stages.

In the example embodiments, the fluid compressor system 1000 includes a contact-cooled rotary (CCR) compressor, and the coolant used in the coolant circulation system 1100 is oil. In other embodiments, the coolant may be water, or another fluid configured to remove excess heat from the working fluid, keeping the airend discharge temperature within a desired temperature range.

The valve endcap 104 may be removably attached to the valve housing 102 using a plurality of fasteners 212. In other embodiments (not shown), the valve endcap 104 may be screwed into or screwed around the respective end of the valve housing 102. In yet another embodiment (not shown), the valve endcap 104 may be adhered to the valve housing 102 using an adhesive or may be welded to the valve housing 102.

Figure 2A:
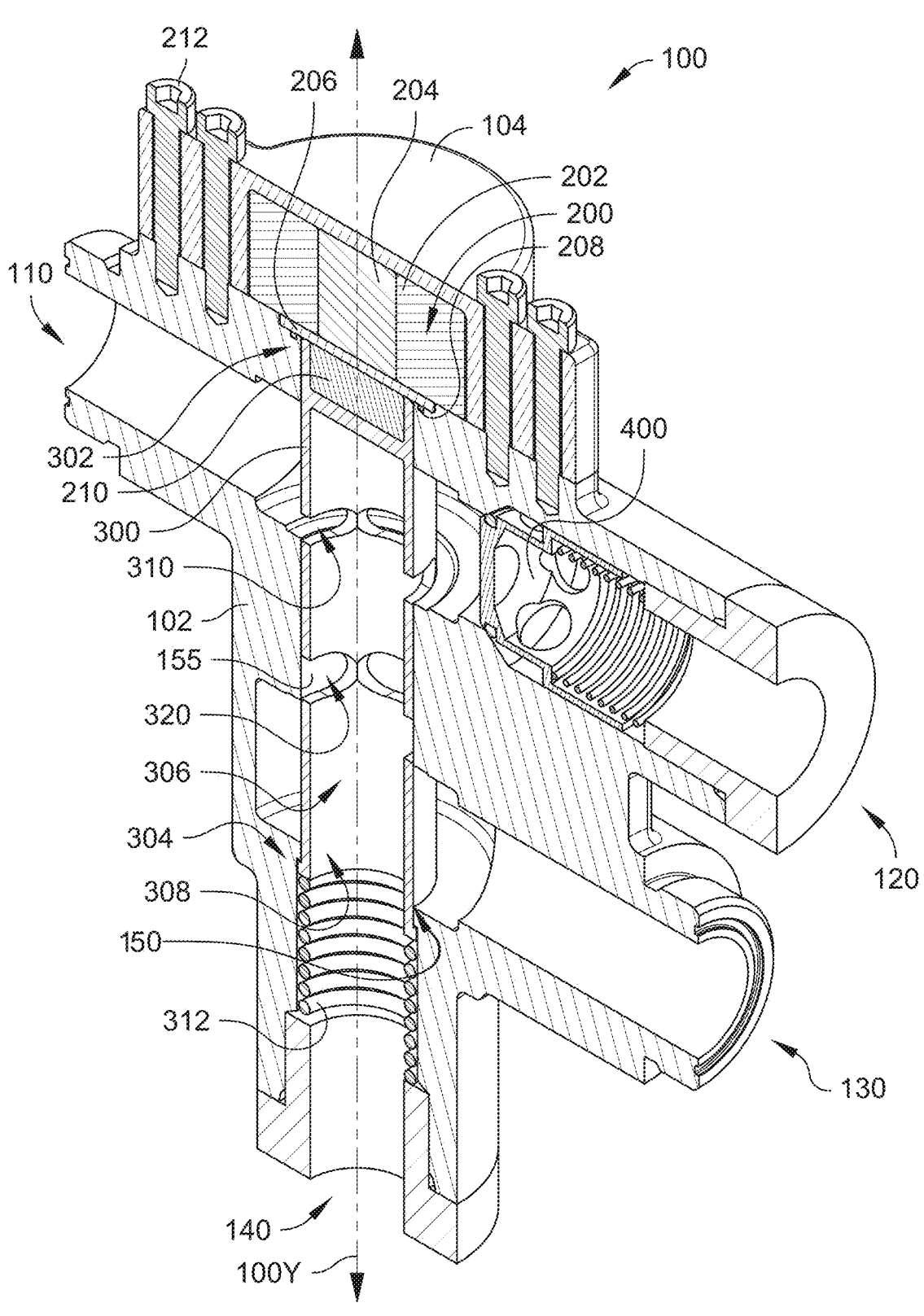
FIG. 2A is an isometric cross-sectional view of the EMTCV shown in FIG. 1 having a movable sleeve in an idle position in accordance with example embodiments of the present disclosure.
Figure 2B:
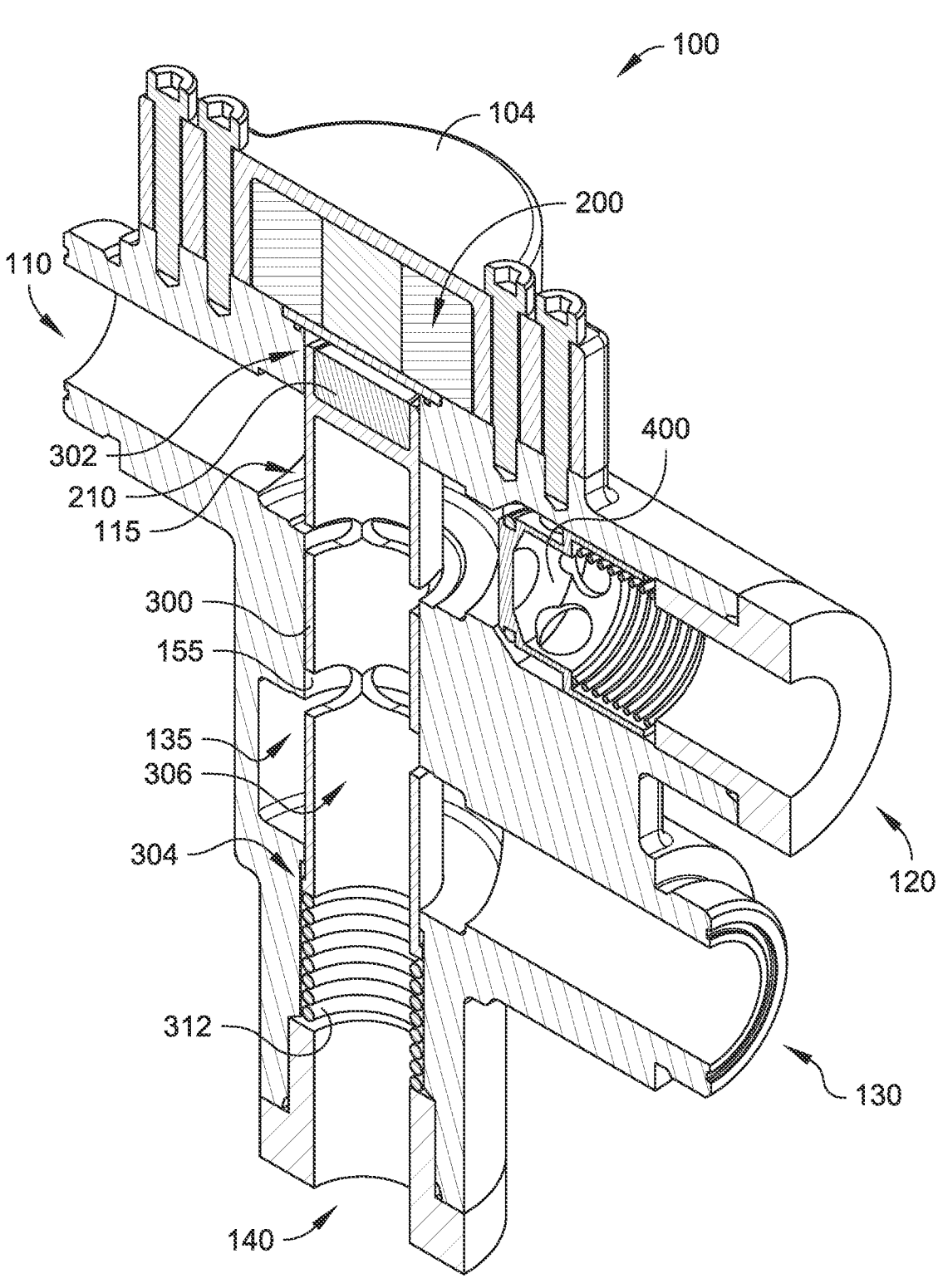
FIG. 2B is an isometric cross-sectional view of the EMTCV shown in FIG. 1 having a movable sleeve in an intermediate position in accordance with example embodiments of the present disclosure.
Figure 2C:
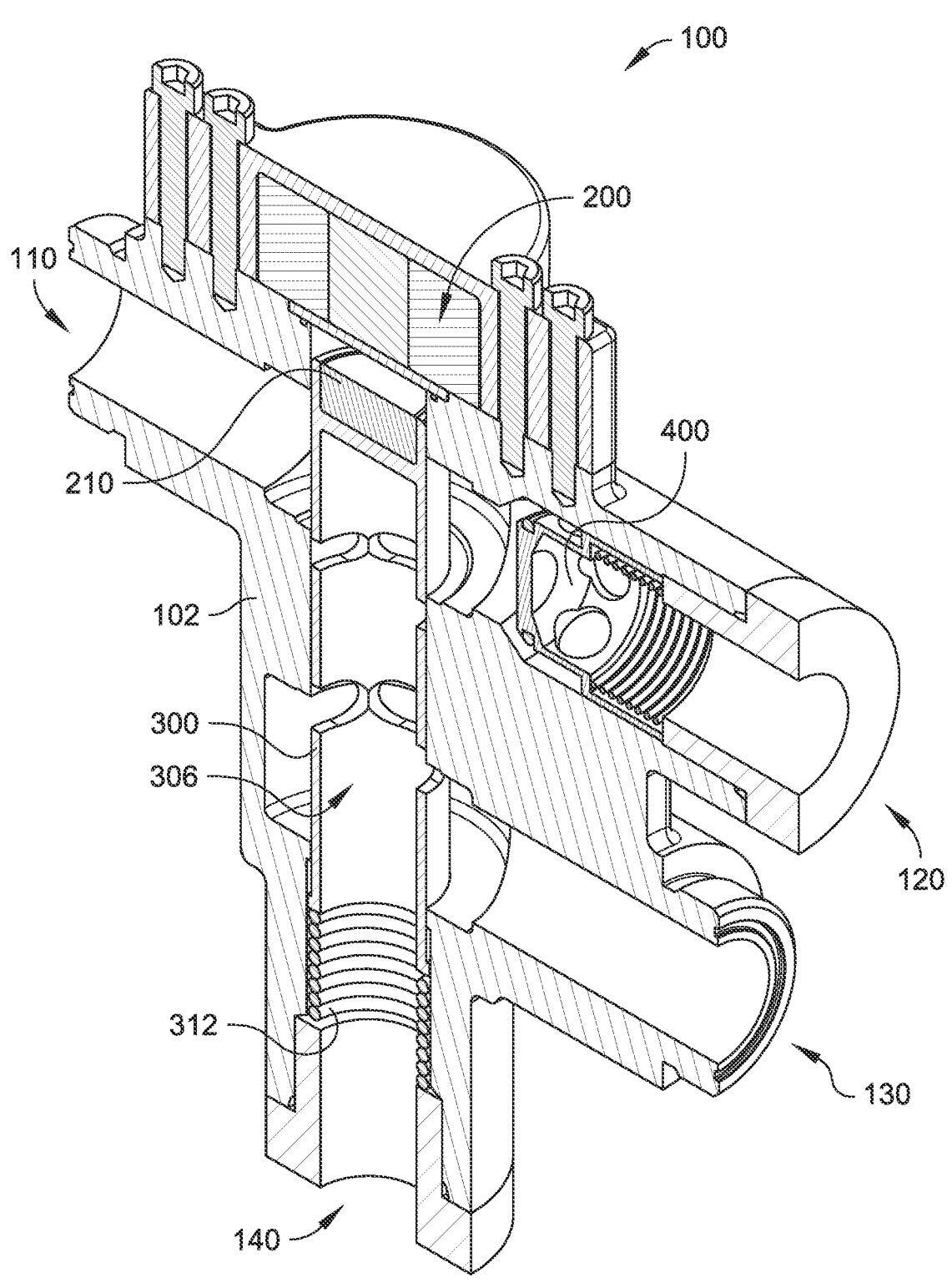
FIG. 2C is an isometric cross-sectional view of the EMTCV shown in FIG. 1 having a movable sleeve in an actuated position in accordance with example embodiments of the present disclosure.

As shown in FIGS. 2A through 2C, the valve endcap 104 houses an electromagnet 200. The electromagnet 200 may include an electromagnetic coil 202 surrounding a core 204. The valve housing 102 may include an end plate 206 and a seal 208 covering an opening (not shown) to the main chamber 150, where the end plate 206 is adjacent to the electromagnet 200 housed in the valve endcap 104. The valve housing 102 and the valve endcap 104 may be composed from a non-magnetic material to minimize leakage of magnetic forces in any direction other than the intended.

As shown in FIG. 2A, the EMTCV 100 includes a movable sleeve 300 disposed inside main chamber 150. The movable sleeve 300 has a first sleeve end 302 and a second end 304 along the longitudinal axis 100Y and opposite to each other. The movable sleeve 300 defines a sleeve chamber 306. The movable sleeve 300 further defines a permanent magnet cavity holding a permanent magnet 210, where the permanent magnet 210 may be adjacent to the end plate 208, opposite to the electromagnet 200. The permanent magnet 210 is fixedly attached to the movable sleeve 300 and may be located at the first end 302 or at the second end 304. The permanent magnet 210 may be composed of a material resistant to deterioration from being exposed to high-temperatures. For example, the permanent magnet may be made from neodymium, samarium cobalt, ceramic, or alloys including aluminum, nickel, and cobalt, among others.

Figure 3:
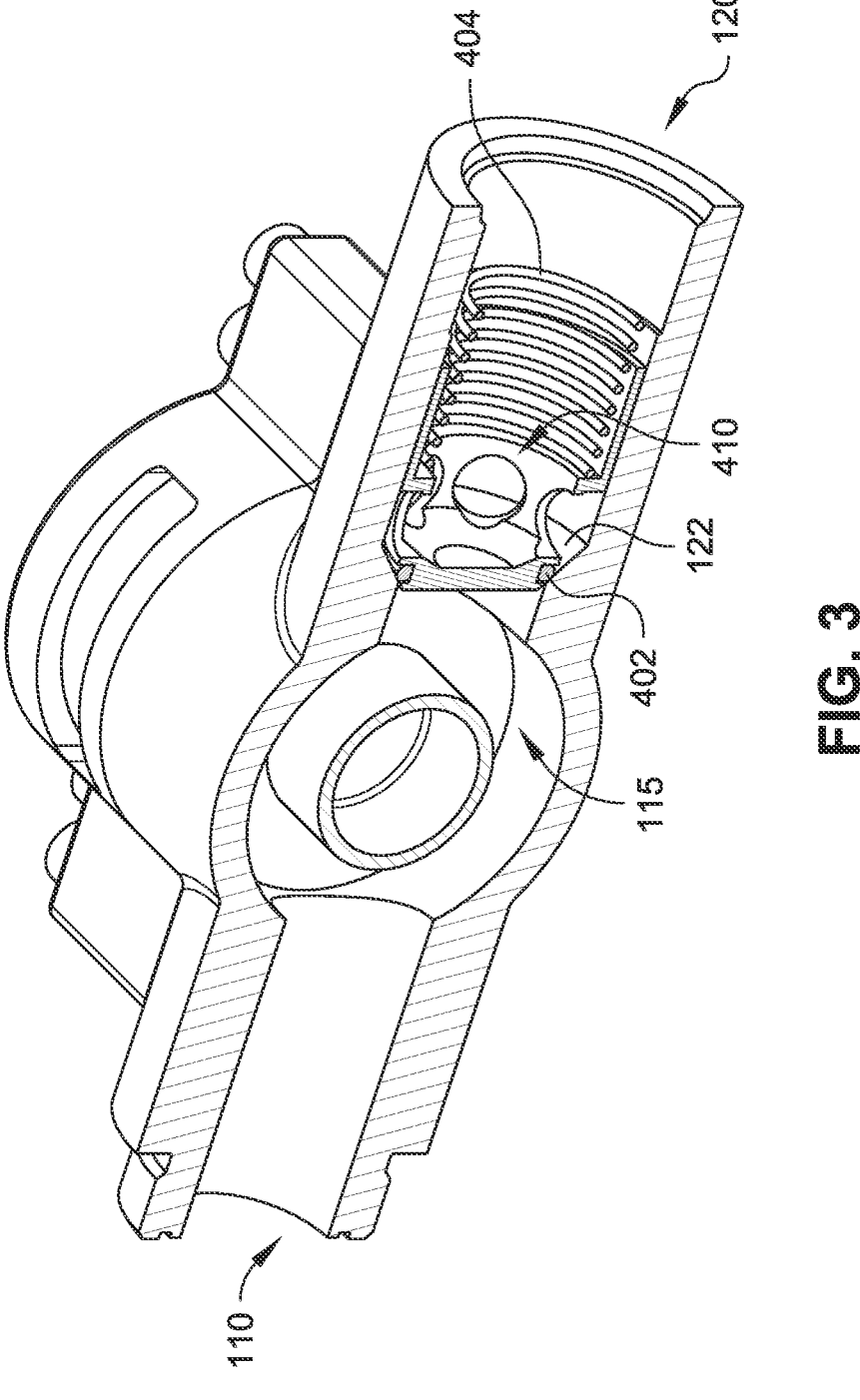
FIG. 3 is an isometric cross-sectional view of the EMTCV shown in FIG. 1 cut along line '3' having a first sub-chamber surrounding the movable sleeve in accordance with example embodiments of the present disclosure.
Figure 4:
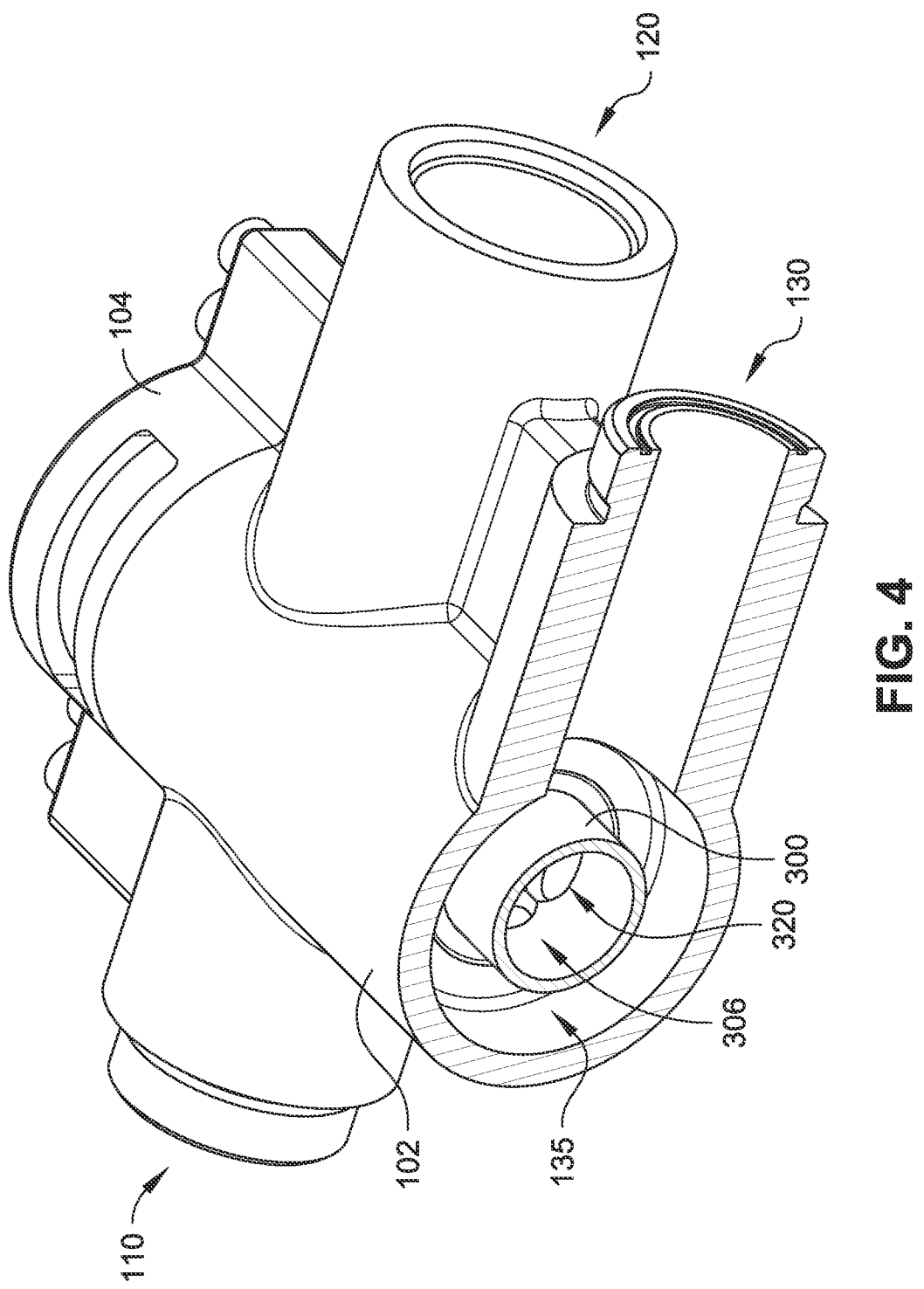
FIG. 4 is an isometric cross-sectional view of the EMTCV shown in FIG. 1 along line '4' having a second sub-chamber surrounding the movable sleeve in accordance with example embodiments of the present disclosure.
Figure 5:
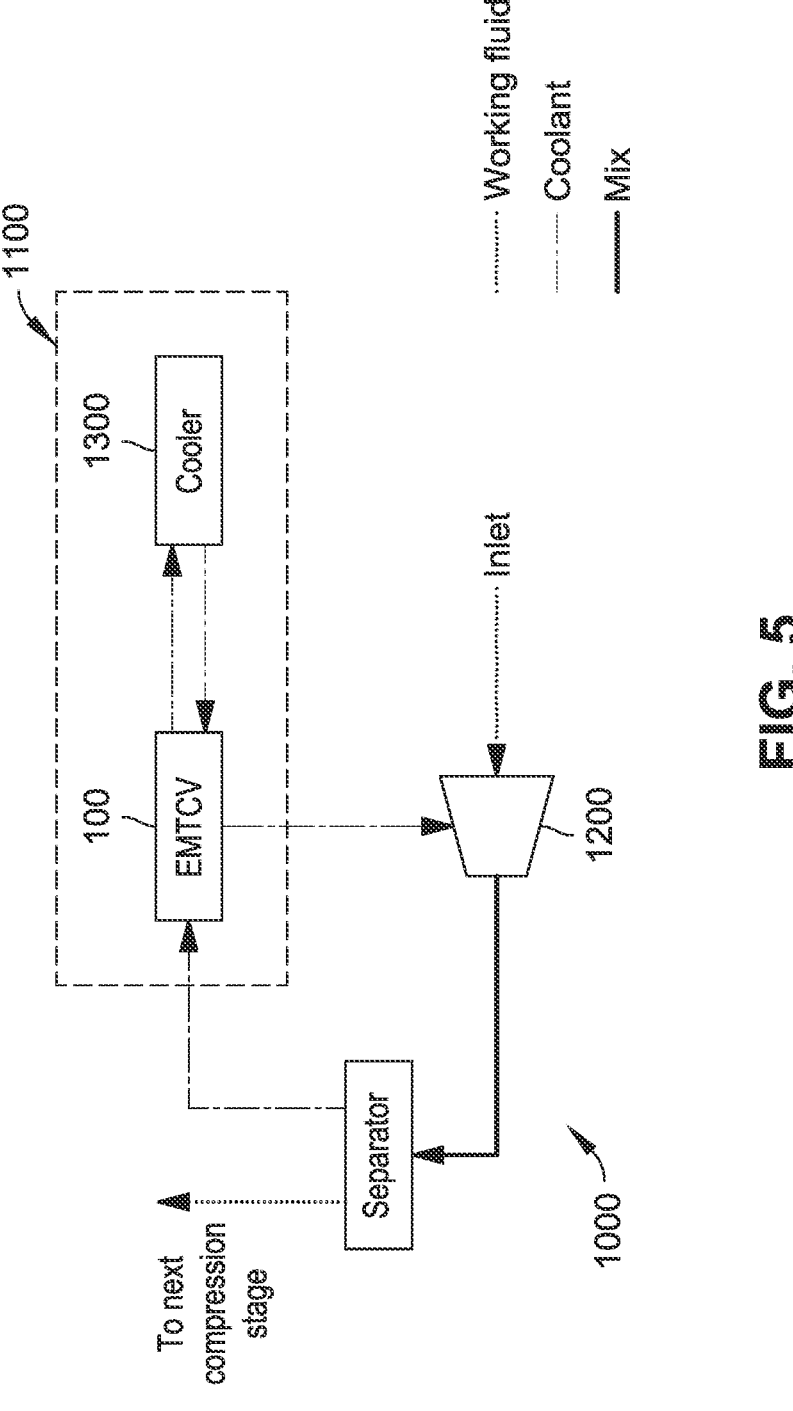
FIG. 5 is a schematic view of a fluid compressor system having a coolant circulation system including a EMTCV in accordance with example embodiments of the present disclosure.

The movable sleeve 300 further defines a first sleeve inlet 310 and a second sleeve inlet 320, where the first sleeve inlet 310 fluidly connects the first sub-chamber 115 to the sleeve chamber 306 and the second sleeve inlet 320 fluidly connects the second sub-chamber 135 to the sleeve chamber 306. Furthermore, the movable sleeve 300 defines a sleeve outlet 308 configured to fluidly connect the sleeve chamber 306 with the coolant fluid outlet 140. In the example embodiment shown, the first sub-chamber 115 is disposed between the coolant fluid inlet 110 and the cooler inlet 120, as shown in FIG. 3. The second sub-chamber 135 is defined at an exit of the cooler outlet 130, as shown in FIG. 4.

The movable sleeve 300 is configured to be moved between a plurality of positions along the longitudinal axis 100Y. For example, the movable sleeve 300 may be moved between an idle position as shown in FIG. 2A, an intermediate position as shown in FIG. 2B, and an actuated position as shown in FIG. 2C.

In the idle position, shown in FIG. 2A, the permanent magnet 210 housed in the first sleeve end 302 of the movable sleeve 300 rests against the endplate 206 and/or the electromagnet 200. In this idle position, the entirety of the first sleeve inlet 310 is open to the first sub-chamber 115 while the second sleeve inlet 320 is not open to the second sub-chamber 135. In the idle position, the second sleeve inlet 320 faces an inner surface 155 of the main chamber 150. As the movable sleeve 300 moves towards an intermediate position, the permanent magnet 210 moves away from the electromagnet 200 as shown in FIG. 2B. The first sleeve inlet 310 is partially closed from the first sub-chamber 115 and is partially covered by the inner surface 155. In the intermediate position of the movable sleeve 300, the second sleeve inlet 320 partially opens, fluidly connecting the second sub-chamber 135 with the sleeve chamber 306. As the movable sleeve 300 reaches the actuated position (FIG. 2C) the first sleeve inlet 310 is fully closed to the first sub-chamber 115, preventing or not allowing a fluid flow into the sleeve chamber 306. In the actuated position, the second sleeve inlet 320 fully opens the sleeve chamber 306 to the second sub-chamber 135.

In example embodiments (not shown), the EMTCV 100 may include a plurality of permanent magnets 210 located at either the first end 302 or the second end 304 of the movable sleeve 300, or surrounding the movable sleeve 300. The EMTCV 100 may also include a plurality of electromagnets 200 located in the valve housing 102 in proximity to the movable sleeve 300. The plurality of electromagnets 200 are supplied with a current by the valve control system and actuate the movable sleeve 300. It should be understood that any number combination of electromagnets 200 and permanent magnets 210 may be implemented in an embodiment of the EMTCV 100 on either the first end 302 and/or the second end 304 of the movable sleeve 300.

In other example embodiments (not shown) the EMTCV 100 may not include a permanent magnet 210 attached to the movable sleeve 300. In this example, the electromagnet 200 may exert either an attractive or a repulsive force directly on the movable sleeve 300. In this example, the movable sleeve 300 is composed from a ferromagnetic material that has a high susceptibility to being attracted to magnetic fields produced by the permanent magnet 210. Examples of ferromagnetic materials include but are not limited to iron, cobalt, nickel, etc., or alloys and other combinations thereof.

In example embodiments, as shown in FIGS. 2A through 2C, the movable sleeve 300 is biased in a direction towards the valve endcap 104 and/or the electromagnet 200 by a biasing component (e.g., a spring) 312. For example, the biasing component 312 may be a compression spring, a tension spring, or the like. In other embodiments (not shown) the biasing component 312 may bias the movable sleeve 300 away from the valve endcap 104 and/or the electromagnet 200. In other embodiments (not shown) the EMTCV 100 may include a plurality of biasing components 312 or may not include any biasing component 312 biasing the movable sleeve 300 towards any predetermined position.

When the EMTCV 100 is actuated, a current is supplied to the electromagnet 200, creating a magnetic field that exerts a force on the permanent magnet 210. The actuation of the EMTCV 100 may be controlled by a valve control system (not shown), where the valve control system positions the movable sleeve 300 by balancing the forces acting on the movable sleeve 300. The valve control system may be in communication with a plurality of sensors, including but not limited to airend temperature sensors, pressure sensors, working fluid humidity sensors, ambient temperature sensors, ambient humidity sensors, etc. The valve control system may receive an input temperature, or a desired airend temperature to maintain. The forces acting on the movable sleeve 300 may be a combination of magnetic forces exerted by the electromagnet 200 to either the permanent magnet 210 or directly to the movable sleeve 300, gravitational forces, and/or biasing forces acting on the movable sleeve 300. The movable sleeve 300 may be mechanically or magnetically biased towards the idle position, directing the coolant fluid flow to by-pass the cooler 1300. If the coolant circulation system 1100 or the fluid compressor system 1000 is shut-down, the movable sleeve 300 will remain biased towards the idle position.

In the embodiment shown, when the valve control system actuates the electromagnet 200, the electromagnet 200 exerts a repulsive force with respect to the permanent magnet 210, pushing the permanent magnet 210 away from the electromagnet 200 in a direction towards the second end 304 of the movable sleeve 300. This repulsive electromagnetic force fully actuates or partially actuates the movable sleeve 300 into a fully actuated position or into a plurality of intermediate positions, respectively. It should be understood that if the electromagnet 200 and/or the permanent magnet 210 were located at a different end of the movable sleeve 300, the actuation of the electromagnet 200 may move the movable sleeve 300 in a direction towards the first end 302 of the movable sleeve 300. For example, the polarity of the electromagnet 200 may be reversed by reversing the polarity and/or direction of the current supplied, causing the electromagnet 200 to exert an attractive force with respect to the permanent magnet 210, thereby pulling the permanent magnet 210 and the movable sleeve in a direction towards the first end 302 of the movable sleeve 300.

The electromagnetic force generated by the electromagnet 200 is proportional to a current supplied to the electromagnet 200 by the valve control system. The more current is supplied to the electromagnet 200, the stronger the electromagnetic force exerted by the electromagnet 200 is. In the example embodiment where the electromagnet 200 exerts a repulsive force to the permanent magnet 210, the stronger the current supplied to the electromagnet 200 is, the stronger the force pushing the permanent magnet 210 and the movable sleeve 300 away from the electromagnet 200. This relationship between the current supplied to the electromagnet 200 and the force exerted by the electromagnet 200 allows to vary the movement of the movable sleeve to a plurality of intermediate positions by controlling the amount and the direction of the current supplied to the electromagnet 200, which in turn controls the amount of coolant flowing to the cooler 1300.

During operation of the EMTCV 100, at the idle position, the coolant fluid flows into the coolant fluid inlet 110, filling the first sub-chamber 115, and flowing into the sleeve chamber 306 through the first sleeve inlet 310. The coolant fluid exits the sleeve chamber 306 through the sleeve outlet 308 and flows out of the EMTCV 100 through the coolant fluid outlet 140, completely by-passing the cooler 1300. In example embodiments, the cooler inlet 120 may include a check valve 400 located at the entrance of the cooler inlet 120. The check valve 400 blocks coolant fluid backflow from the cooler 1300 from returning to the first sub-chamber 115. The check valve 400 may also block coolant fluid flow into the cooler 1300 as the coolant fluid accumulation in the first sub-chamber is lower than a cracking pressure of the check valve 400 when the first sleeve inlet 310 is fully open to the first sub-chamber 115 in the idle position of the movable valve 300. It should be understood that the EMTCV 100 may not include a check valve 400 in different embodiments.

The check valve 400 may include an opening 410 to allow the flow of coolant fluid. The check valve 400 may also include a biasing component 404 such as, but not limited to, a compression spring, and a check valve seal 402, where the biasing component biases the check valve seal against a shoulder 122 defined in the cooler inlet 120.

As the temperature of the working fluid increases, the valve control system partially actuates the EMTCV 100 by supplying a current to the electromagnet 200. The electromagnet 200 exerts a force on the permanent magnet 210 and/or the movable sleeve 300 to move (e.g., push, pull, etc.) the movable sleeve 300 from the idle position to one of a plurality of intermediate positions. As the movable sleeve 300 is moved, the first sleeve inlet 310 is partially closed by the inner surface 155 of the valve housing 102. The partially closed first sleeve inlet 310 allows a lower volume of coolant fluid flow into the sleeve chamber 306 from the first sub-chamber 115. As a pressure inside the first sub-chamber 115 increases, the pressure of the coolant fluid surpasses the cracking pressure of the check valve 400, partially opening the check valve 400. The coolant fluid flow is split between a first coolant flow that enters the first sleeve inlet 310 and a second coolant flow flowing into the cooler inlet 120 to be cooled in the cooler 1300. The second coolant flow returns from the cooler 1300 through the cooler outlet 130 and fills the second sub-chamber 135. The second coolant flow then enters the sleeve cavity 306 through the partially opened second sleeve inlet 320 and is rejoined with first coolant flow prior to exiting the EMTCV 100 through the coolant fluid flow outlet 140.

If the temperature of the working fluid and/or the airend discharge temperature exceeds a predetermined range, the valve control system of the EMTCV 100 fully actuates the movable sleeve 300 to the actuated position, where the first sleeve inlet 310 is completely closed, directing the entirety coolant fluid flow from the first sub-chamber 115 to the cooler inlet 120 through the fully opened check valve 400. After being cooled in the cooler 1300, the coolant fluid once again enters the EMTCV 100 through the cooler outlet 130 and is directed to the sleeve chamber 306 via the now fully-opened second sleeve inlet 320. The cooled coolant fluid exits the EMTCV 100 through the coolant fluid outlet 140.

In example embodiments (not shown), the current supplied to the electromagnet 200 by the valve control system to energize electromagnet 200 and exert a force on the permanent magnet 210 is reversed, thereby supplying an electromagnetic force that pulls the permanent magnet 210 in a direction towards the electromagnet 200 and pulling the movable sleeve towards the idle position.

In embodiments, at least one temperature input of the airend discharge is provided to the valve control system to allow the electromagnet 200 to position the movable sleeve 300 at a desired position from among the plurality of intermediate positions to achieve a desired airend coolant injection temperature. In addition to the airend discharge temperature input, an additional ambient humidity and ambient temperature input may be sent to the valve control system to allow for the calculation of a pressure-dew-point temperature for the working fluid and the coolant fluid mixture. This data may enable the valve control system to maintain the coldest airend discharge temperature possible without forming condensation in the coolant fluid.

Additionally, the valve control system may be in communication with a controller that controls a variable speed cooling fan on air cooled compressor packages, for improved energy efficiency of a fan motor energy consumption (i.e.: slow it down as appropriate). The valve control system may also use the data acquired by one or more of the sensors discussed above to send to the controller for the operation of other compressor components such as, but not limited to, drain valves and integrated dryers, or external system components such as standalone dryers and drain valves.

The EMTCV may be connected to different components (not shown) of the coolant circulation system 1100, including but not limited to a separator tank, a cooler such as an evaporator or a heat exchanger, a contact-cooled airend, another temperature controlled valve (TCV), another EMTCV, etc. For example, in a CCR compressor, after being separated from the working fluid and discharged from the separator tank, a hot coolant may be directed to the EMTCV 100. The EMTCV 100 can control and selectably direct the coolant flow in the coolant circulation system 1100 towards the cooler (e.g., the evaporator) or the airend based on the desired temperature of the coolant flow. As the cooled coolant fluid exits the cooler, it may flow back into the EMTCV through the cooler outlet 130, where the EMTCV 100 directs the coolant fluid back to contact-cooled airend after exiting the coolant fluid outlet 140.

In another embodiment (not shown), the coolant circulation system 1100 may include a first cooler, a second cooler, a primary EMTCV and a secondary EMTCV fluidly connected to a respective contact-cooled airend. In this embodiment, the coolant fluid may be directed to a secondary EMTCV after exiting a first cooler, where the secondary EMTCV selectably directs the cooled coolant to a second cooler for further cooling or back into the contact-cooled airend through the primary EMTCV, depending on the desired temperature of the coolant prior to entering the contact-cooled airend. In example embodiments, the fluid compressor system 1000 may have any number of EMTCVs and is not limited to having only a primary and a secondary EMTCV in connection with a respective airend.

In embodiments, the cooler 1300 may be a brazed plate heat exchanger, but any other type of heat exchanger may be used to absorb heat from the hot coolant according to example embodiments of the present disclosure.

In the example embodiment shown in FIGS. 2A through 4, the seal 208 is an O-ring seal. In other example embodiments, the seal may be a U-ring, a V-ring, a flat seal, a lip seal, guide rings, among others. The ring seals may be composed from Polytetrafluoroethylene (PTFE), nitrile, neoprene, ethylene propylene diene monomer (EPDM) rubber, a fluorocarbon rubber, or a combination thereof.

In example embodiments, the fluid compressor system 1000 includes a CCR screw compressor. In other example embodiments (not shown), the fluid compressor system 1000 may have an oil-free rotary (OFR) screw compressor, a rotary vane compressor, a reciprocating compressor, a centrifugal compressor or an axial compressor. In other example embodiments, the EMTCV may be incorporated or retrofitted with other equipment having a compression application, including but not limited to, heating, ventilation, and air conditioning (HVAC) systems, refrigeration systems, gas turbine systems, automotive applications, and so forth. In yet another example, the EMTCV may be used as a three-way valve and used in operations with power tools, pumps, blowers, medical devices, etc.

While the subject matter has been illustrated and described in detail in the drawings and foregoing description, the same is to be considered as illustrative and not restrictive in character, it being understood that only some embodiments have been shown and described and that all changes and modifications that come within the spirit of the subject matter are desired to be protected. In reading the claims, it is intended that when words such as "a," "an," "at least one," or "at least one portion" are used there is no intention to limit the claim to only one item unless specifically stated to the contrary in the claim. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A coolant circulation system for regulating a discharge temperature in a compressor airend, the coolant circulation system comprising:
    a cooler configured to cool a coolant fluid circulating through the coolant circulation system; and
    an electro-magnetic thermal control valve (EMTCV) configured to direct and control the amount of coolant fluid to the cooler, the EMTCV including:
    a valve housing defining a main chamber, a coolant fluid inlet, a coolant fluid outlet, a cooler inlet, and a cooler outlet,
    a valve endcap removably attached to the valve housing, the valve endcap covering an opening to the main chamber,
    an electromagnet disposed in the valve endcap,
    a movable sleeve disposed within the main chamber, the movable sleeve having a first end, the first end of the movable sleeve holding a permanent magnet, and
    an end plate disposed on the valve housing proximate to the valve endcap, the end plate configured to hold the permanent magnet within the main chamber,
    the movable sleeve configured to move between an idle position, an intermediate position, and an actuated position, wherein when the electromagnet is energized the electromagnet exerts a force with respect to the permanent magnet, to move the movable sleeve towards the actuated position.

2. The coolant circulation system of claim 1, wherein the EMTCV further includes a spring biasing the movable sleeve in the idle position, in a direction towards the first end of the movable sleeve when the electromagnet is not energized.

3. The coolant circulation system of claim 2, wherein spring is at least one of a compression spring or a tension spring.

4. The coolant circulation system of claim 1, wherein the force generated by the electromagnet is proportional to a current supplied to the electromagnet, allowing to vary the movement of the movable sleeve to a plurality of intermediate positions and control the amount of coolant flowing to the cooler.

5. The coolant circulation system of claim 1, wherein the EMTCV further includes a first sleeve inlet, a second sleeve inlet, and a sleeve outlet and the valve housing further defines a first sub-chamber and a second sub-chamber,
    wherein the first sub-chamber is defined between the coolant fluid inlet and the cooler inlet and the first sleeve inlet is configured to directly receive a fluid flow from the first sub-chamber, and
    wherein the second sub-chamber is defined at an exit of the cooler outlet and the second sleeve inlet is configured to directly receive a fluid flow from the second sub-chamber.

6. The coolant circulation system of claim 5, wherein at the idle position, the coolant fluid flows into the coolant fluid inlet, filling the first sub-chamber, flowing into a sleeve chamber through the first sleeve inlet, and exiting through the coolant fluid outlet, by-passing the cooler.

7. The coolant circulation system of claim 5, wherein at the intermediate position, the coolant fluid flows from the coolant fluid inlet to the first sub-chamber and is split between a first coolant fluid flow and a second coolant fluid flow, the first coolant fluid flow flowing into the sleeve chamber through the first sleeve inlet, and the second coolant fluid flowing to the cooler inlet to be cooled prior to entering the second sub-chamber through the cooler outlet, entering the sleeve chamber through the second sleeve inlet and rejoining the first coolant fluid flow prior to exiting through the coolant fluid outlet.

8. The coolant circulation system of claim 5, wherein at the actuated position, the coolant fluid flows into the coolant fluid inlet, filling the first sub-chamber and flowing to the cooler inlet to be cooled in the cooler, leaves the cooler through the cooler outlet and flows into the second sub-chamber prior to entering the sleeve chamber through the second sleeve inlet, and exits through the coolant fluid outlet.

9. The coolant circulation system of claim 1, wherein a current supplied to the electromagnet to energize the electromagnetic force is reversed, supplying an electromagnetic force that pulls the permanent magnet in a direction towards the electromagnet, and pulling the movable sleeve towards the idle position.

10. An electro-magnetic thermal control valve (EMTCV) configured to selectably direct and control an amount of coolant fluid to a cooler in a coolant circulation system, the EMTCV comprising:

a valve housing defining a main chamber, a coolant fluid inlet, a coolant fluid outlet, a cooler inlet, and a cooler outlet;

a valve endcap removably attached to the valve housing, the valve endcap covering an opening to the main chamber, an electromagnet disposed in the valve endcap;

a movable sleeve disposed within the main chamber, the movable sleeve having a first end and a second end, and defining a sleeve chamber, the first end of the movable sleeve holding a permanent magnet, and an end plate disposed on the valve housing proximate to the valve endcap, the end plate configured to hold the permanent magnet within the main chamber, the movable sleeve configured to move between an idle position, an intermediate position, and an actuated position, wherein when the electromagnet is energized the electromagnet exerts a force with respect to the permanent magnet to move the movable sleeve towards the actuated position.

11. The EMTCV of claim 10, further comprising a biasing component biasing the movable sleeve in the idle position, in a direction towards the first end of the movable sleeve when the electromagnet is not energized.

12. The EMTCV of claim 10, wherein the biasing component is at least one of a compression spring or a tension spring.

13. The EMTCV of claim 10, wherein the force generated by the electromagnet is proportional to a current supplied to the electromagnet, allowing to vary the movement of the movable sleeve to a plurality of intermediate positions and control the amount of coolant flowing to the cooler.

14. The EMTCV of claim 10, wherein the EMTCV further includes a first sleeve inlet, a second sleeve inlet, and a sleeve outlet and the valve housing further defines a first sub-chamber and a second sub-chamber, wherein the first sub-chamber is defined between the coolant fluid inlet and the cooler inlet and the first sleeve inlet is configured to directly receive a fluid flow from the first sub-chamber, and wherein the second sub-chamber is defined at an exit of the cooler outlet and the second sleeve inlet is configured to directly receive a fluid flow from the second sub-chamber.

15. The EMTCV of claim 14, wherein at the idle position, the coolant fluid flows into the coolant fluid inlet, filling the first sub-chamber, flowing into the sleeve chamber through the first sleeve inlet, and exiting through the coolant fluid outlet, by-passing the cooler.

16. The EMTCV of claim 14, wherein at the intermediate position, the coolant fluid flows from the coolant fluid inlet to the first sub-chamber and is split between a first coolant fluid flow and a second coolant fluid flow, the first coolant fluid flow flowing into the sleeve chamber through the first sleeve inlet, and the second coolant fluid flowing to the cooler inlet to be cooled prior to entering the second sub-chamber through the cooler outlet, entering the sleeve chamber through the second sleeve inlet and rejoining the first coolant fluid flow prior to exiting through the coolant fluid outlet.

17. The EMTCV of claim 14, wherein at the actuated position, the coolant fluid flows into the coolant fluid inlet, filling the first sub-chamber and flowing to the cooler inlet to be cooled in the cooler, leaves the cooler through the cooler outlet and flows into the second sub-chamber prior to entering the sleeve chamber through the second sleeve inlet, and exits through the coolant fluid outlet.

18. The EMTCV of claim 10, wherein a current supplied to the electromagnet to energize the electromagnet is reversed, supplying an electromagnetic force that pulls the permanent magnet in a direction towards the electromagnet, and pulling the movable sleeve towards the idle position.

19. An electro-magnetic thermal control valve (EMTCV) configured to selectably direct and control an amount of coolant fluid to a cooler in a coolant circulation system, the EMTCV comprising:

a valve housing defining a main chamber;

a valve endcap removably attached to the valve housing, the valve endcap covering an opening to the main chamber, an electromagnet disposed in the valve endcap;

a movable sleeve disposed within the main chamber, the movable sleeve having a first sleeve inlet and a second sleeve inlet, first end holding a permanent magnet, and an end plate disposed on the valve housing proximate to the valve endcap, the end plate configured to hold the permanent magnet within the main chamber, the movable sleeve configured to move between an idle position, an intermediate position, and an actuated position, wherein when the electromagnet is energized, the electromagnet causes the movable sleeve to move towards the actuated position.

20. The EMTCV of claim 19, wherein a current supplied to the electromagnet to energize the electromagnet is reversed, supplying an electromagnetic force that pulls the permanent magnet in a direction towards the electromagnet, and pulling the movable sleeve towards the idle position.

* * * * *